INVENTOR
WILLIAM R. MACLAY

BY Paul D. Carmichael
ATTORNEY

March 29, 1966 W. R. MACLAY 3,243,788

METHOD OF RECORDING AND REPRODUCING INFORMATION IN WHICH A PLURALITY OF PARALLEL DATA TRACKS ARE OVERLAPPED

Filed June 29, 1961 3 Sheets-Sheet 2

United States Patent Office 3,243,788
Patented Mar. 29, 1966

3,243,788

METHOD OF RECORDING AND REPRODUCING INFORMATION IN WHICH A PLURALITY OF PARALLEL DATA TRACKS ARE OVERLAPPED

William R. Maclay, Endicott, N.Y., assignor to International Business Machines Corporation, New York, N.Y., a corporation of New York Filed June 29, 1961, Ser. No. 120,727
3 Claims. (Cl. 340—174.1)

The present invention relates generally to the art of recording and reproducing information and in particular to an improved method for manifesting intelligence on a magnetizable record medium.

In the electronic data processing arts much use is made of a magnetizable record medium for receiving and storing information until it is required. Magnetic transducers are positioned in closely adjacent relation with respect to the moving magnetizable surface of the record medium during writing and reading operations. The magnetizable record medium may take the form of magnetic tapes, discs or drums, for example. Each of the transducers usually comprises a core of magnetic material having a gap therein. A coil is disposed about the magnetic core and is energized in accordance with the information to be recorded on the magnetizable record medium during writing operations. The change in the magnetic flux in the gap generates electrical signals in the coil which are indicative of the information stored on the magnetizable record medium during reading operations.

In many applications highly accurate and reliable information is required. For example, the loss or distortion of a single information bit in a large scale digital computer may cause a false or inaccurate output or may interrupt the entire operation of the computer. In processing radiated signals containing information it is often necessary to separate the desired information from spurious and extraneous signals. Transmitted radio or reflected radar signals may contain so much noise that the desired information cannot be distinguished in the individual radiated signals.

Majority voting and redundancy techniques are employed for increasing the reliability of data processing apparatus where required. A number of input signals representing desired information quantities are processed in such a manner that the resultant output signal is based or dependent upon the majority of the input signals. For example, if provision is made for three identical or redundant input signals and one of these signals is completely missing or lacks a particular information bit, the resultant output signal will include this information bit since it is present in the other two input signals. The basic teachings of majority voting in logical operations are set forth in U.S. Patent No. 2,815,488 to Dr. John Von Neumann which is assigned to the assignee of the present invention.

Significant considerations in providing apparatus for receiving and storing information are the space needed for storing a desired quantity of the information and the time required to obtain access to any portion of this information. Large scale data processing apparatus require many thousands of bits of storage capacity along with the ability to retrieve or gain access to any particular bit of information in a minimum of time. Various schemes have been proposed for increasing the packing or density of the information quantities within a given area of a magnetizable record medium and access times to the information stored thereon.

Briefly, the present invention relates generally to a method of recording and reproducing information which provides highly accurate and reliable information while yet requiring a minimum of space on a magnetizable record medium. A plurality of redundant input signals each relating to the same information quantity are recorded in adjacent tracks on a magnetizable record medium. Those portions of the input signals corresponding to the same bit of the information quantity occupy similar and related positions on the tracks. To retrieve the recorded information, a transducer simultaneously senses all of the tracks pertaining to the same information quantity. The signal from the transducer is passed through suitable gating means operative to pass only those signals of a greater absolute value than the absolute value of a signal occurring when the desired information is sensed in a minority of the tracks. The resultant output signal is representative of the majority of the redundant input signals recorded on the tracks, and has a high degree of reliability. The transducer and the gating means perform a voting function in that the resultant output signal is determined by the majority of the redundant input signals recorded on the tracks.

The information is recorded on the magnetizable record medium by effectively and partially overlapping the tracks whereby the width of any resultant partially overlapped track is much less than the width of a single record track recorded by the transducer. The width of a single track recorded on a magnetizable record medium is determined by the width of the magnetic core of the transducer and the pattern or width of the fringing flux between the magnetic core and the magnetizable record medium. These factors are controlled by the physical size of the core, the magnetic properties of the core, the spacing between the record medium and the transducer, etc., which are limited by considerations other than the width of a single record track. For example, the magnetic core must be wide enough to satisfy ancillary mechanical and electrical requirements. Heretofore, the width of a magnetizable record medium required for a plurality of tracks was determined by multiplying the width of a single track by the number of tracks plus the spacing provided between the adjacent tracks. In accordance with the teaching of the present invention, the tracks are recorded in a partially overlapped manner and the resultant width of any individual track is much less than the width of a single magnetic track recorded by the transducer. Many more tracks may be recorded in an area of a magnetizable record medium than is possible with prior art techniques of recording information.

It is the primary or ultimate object of the present invention to provide an improved method of recording and reproducing information which provides highly accurate and reliable data. A plurality of record tracks on a record medium and corresponding to redundant information quantities with identical portions thereof disposed in aligned side-by-side relation are simultaneously sensed by a transducer. The output from the transducer is passed through suitable gating means whereby the resultant output signal is based on the majority of the information contained in the record tracks.

Another object of the invention is to provide a method of recording information on a magnetizable record medium wherein the information is recorded on a minimum area of the magnetizable record medium. The adjacent tracks are recorded in partially overlapped relation whereby a portion of the width of each track is erased or written over by the succeeding track recorded on the record medium. The resultant width of any partially overlapped track recorded on the magnetizable record medium is much less than the width of a single track. Maximum utilization is made of the magnetizable record medium in that an extremely large quantity of information is recorded on a selected area of the record medium.

A further object of the invention is to provide a method of the type set forth in the above objects which is characterized by its extreme simplicity in operation and use. The method herein disclosed can be used with existing magnetic recording and reproducing apparatus with a minimum of modification to such apparatus.

The foregoing and other objects, features and advantages of the invention will be apparent from the following more particular description of a preferred embodiment of the invention, as illustrated in the accompanying drawings.

Figure 1:
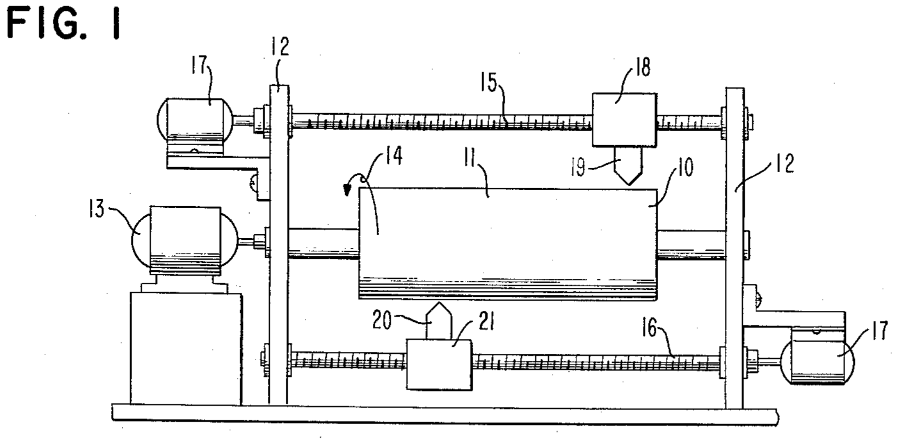
FIGURE 1 is a side view of apparatus employed in connection with the method of the present invention.

Referring now to the drawings, and initially to FIGURE 1 thereof, the reference numeral 10 designates a magnetic drum having a magnetizable outer periphery 11. The outer periphery 11 defines a magnetizable record medium. The magnetic drum 10 is journalled in a supporting structure 12 and is rotated by drive motor 13 in the direction represented by the arrow 14. A pair of very accurate lead screws 15 and 16 span the end plates of the supporting structure 12 and are rotated by the motors 17. Threadably received on the lead screw 15 is a carriage 18 which mounts a write transducer head 19. A read transducer head 20 is mounted from a carriage 21 which is threadably received on the lead screw 16. The lead screws 15 and 16 preferably have different pitches for reasons to be hereinafter more fully explained.

The write and read heads 19 and 20 are positioned in closely adjacent transducing relation with respect to the magnetizable outer periphery 11 of the magnetic drum. The write transducer head 19 is adapted to record information quantities on the magnetizable record medium 11 while the read transducer head 20 senses information quantities previously recorded on this medium. The transducer heads 19 and 20 move longitudinally with respect to the rotating magnetic drum upon proper energization of the motors 17 driving the lead screws 15 and 16. Each portion of the outer periphery of the magnetic drum may be exposed to the read and write transducer heads.

Figure 2:
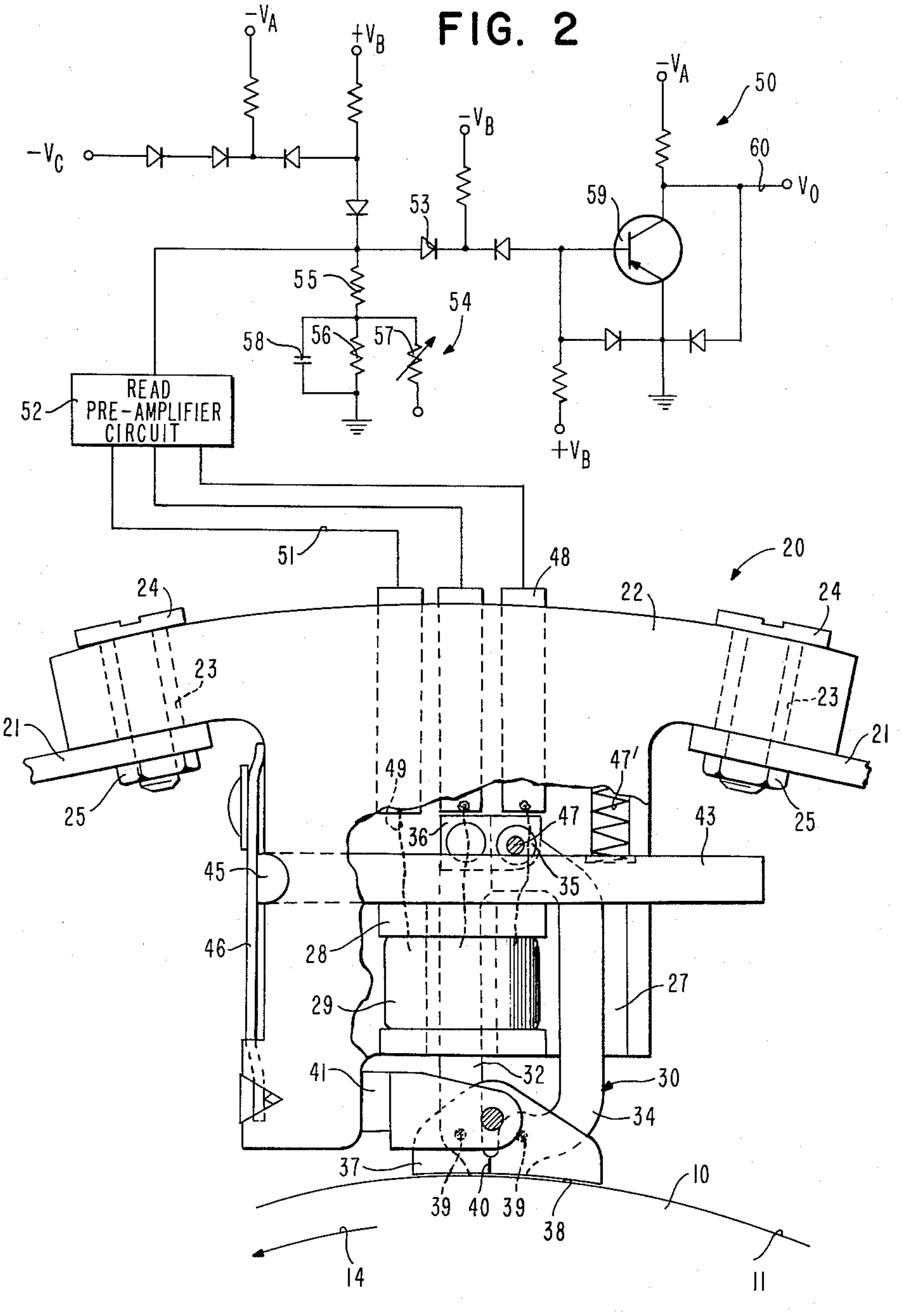
FIGURE 2 is a side view, partially in section, of a transducer used in connection with the apparatus of FIGURE 1.

The read and write transducer heads 19 and 20 are generally the same and, to avoid unnecessary repetition in the specification and duplication in the drawings, only the read transducer head 20 will be described in detail. As shown in FIGURE 2 of the drawings, the read transducer head 20 comprises a support housing 22 having holes 23 therein for mounting this housing from the movable carriage 20. The mounting is accomplished by screws 24 extending through the holes 23 and threaded into lugs 25.

The support housing 22 has an internal opening 27. A coil support or bobbin 28 having a suitable electric coil 29 wound thereon is rigidly supported from the side walls of the housing.

Mounted for free movement within the internal opening 27 is a core structure 30 comprising a pair of legs 32 and 34. The legs 32 and 34 are connected together at the top by rivets 35 and a connecting bracket 36. The leg 32 passes freely through the center aperture of the coil support 28. The lower ends of the core legs 32 and 34 are received in a supporting shoe 37 having a bottom surface 38 of a relatively large area curved to conform to the peripheral surface 11 of the magnetic drum 10. The core legs 32 and 34 are secured to the supporting shoe by pins 39. A small separation is maintained between the core legs 32 and 34 within the supporting shoe 37 and adjacent the magnetizable record medium 11 to provide a gap 40. A gimbal structure 41 allowing two degrees of angular freedom substantially in a plane parallel to the magnetizable record medium 11 under the gap 40 is provided for the supporting shoe 37. As is well known in the magnetic recording art, the supporting shoe 37 is adapted to be supported or ride on the laminar boundary of fluid surrounding the outer periphery of the rotating magnetic drum whereby the core structure is maintained in closely adjacent transducing relation with respect to the magnetizable record medium.

Means are provided for lifting the supporting shoe 37 and the core structure 30 carried thereby away from the magnetizable record medium 11 during starting and stopping operations so that the friction of the supporting shoe bearing directly on the surface is eliminated and the torque required for starting the record medium is substantially reduced. The lifting means comprises a lifting bar 43 secured or mounted in the supporting housing 22. The lifting bar has a side projection 45 which is semi-cylindrical in shape and whose rounded side cooperates with a notch in the housing, not shown, to provide a pivoted connection. A flat spring 46 biases the projection 45 into its cooperating notch. When lifting bar 43 moves upward about its pivot point, an extension 47 of one of the rivets 35 is contacted and carries the core structure 30 and supporting shoe 37 upwards with it. A spring 47' biases the lifting bar 43 to its lower position. To retract the supporting shoe 37 and the core structure 30 a force need only be applied to the bottom of the lifting bar 43 to raise the same upwards.

As previously mentioned, the write and read transducer heads 19 and 20 are generally similar in construction. To record information on the magnetizable record medium 11, electrical signals representing and corresponding to desired information quantities are supplied through terminal pins 48 and conductors 49 to the electric coil 29 of the write transducer head 19. The magnetic flux in the gap 40 is changed in accordance with the information quantities and, as a result, a magnetized pattern of information is recorded in a track on the magnetizable record medium 11. In retrieving information from the magnetizable record medium, the read transducer head 20 passes over the magnetized patterns of information which induces electrical signals in the coil 29 corresponding to the recorded information.

A more detailed description of the disclosed read and write transducer heads is to be found in the co-pending application of Harry Charnetsky, Jr., and the present inventor, Serial Number 845,687, filed October 12, 1959, now Patent No. 3,072,752, entitled "Apparatus for Manifesting Intelligence on Record Media," which is assigned to the assignee of the present invention. It should be understood that the present invention is not limited to the use of any particular design of a magnetic transducer head.

A gating means 50 is also depicted in FIGURE 2 of the drawings. The terminal pins 48 are connected by conductors 51 to a conventional read pre-amplifier circuit 52. The output from the read pre-amplifier circuit 52 is coupled with a diode 53 which is normally maintained in a back biased and nonconducting state by an adjustable bias network 54 comprising the resistors 55–57 and capacitor 58. The arrangement is such that the diode 53 remains nonconductive and appears as a very high impedance circuit element until the voltage level of the signal coming from the read pre-amplifier 52 exceeds the bias voltage supplied by the bias network 54 and the breakdown voltage of this diode. When diode 53 is enabled, a transistor 59, which is connected in grounded emitter configuration, is rendered conductive and a change is evidenced in the output signal $V_O$ appearing on conductor 60.

In essence, the gating means 50 defines an adjustable voltage level switch. The cumulative output signal from the read transducer head 20 and the read pre-amplifier circuit 52 must exceed a certain bias level determined by the adjustable bias network 54 before the diode 53 is enabled and a change is evidenced in the resultant output signal $V_O$ appearing on conductor 60. As will be hereinafter more fully explained, the bias network 54 is adjusted so that the output signal $V_O$ on conductor 60 is representative of the redundant information sensed by the read transducer head 20 in a majority of a plurality of adjacent record tracks on the magnetizable surface 11 of the magnetic drum.

Figure 3:
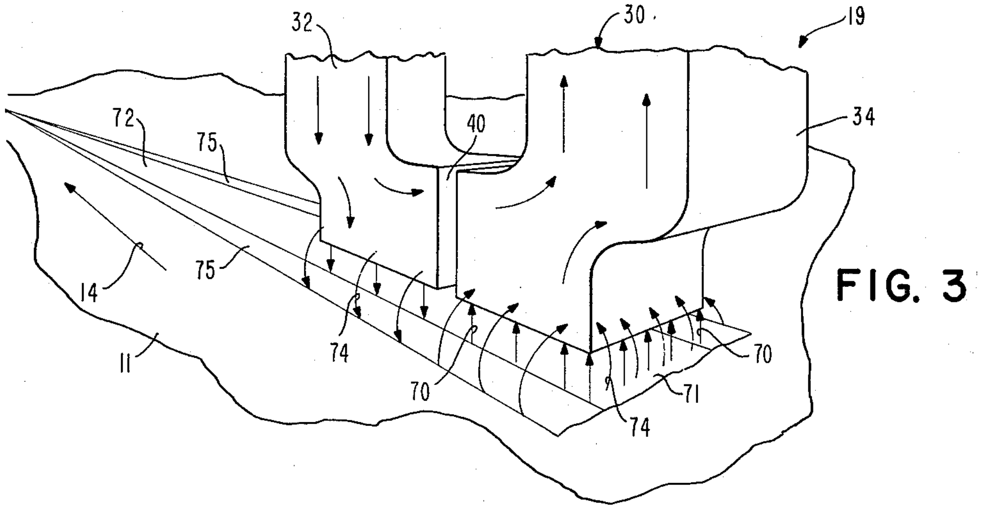
FIGURE 3 is an enlarged perspective view showing a transducer recording a single track on a magnetizable record medium.
Figure 4:
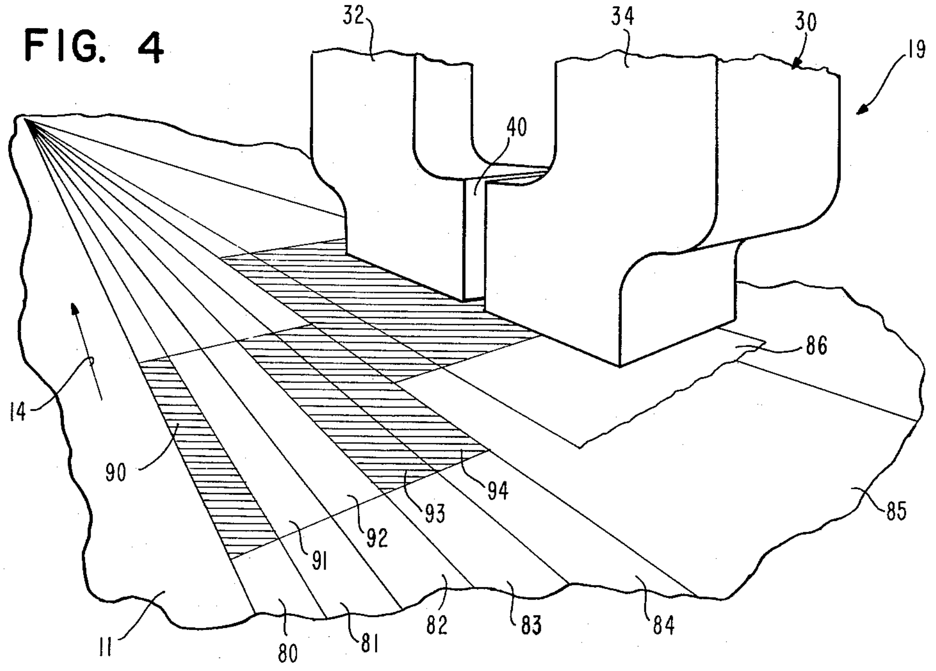
FIGURE 4 is a perspective view similar to FIGURE 3 depicting the recording of adjacent tracks on a magnetizable record medium in partially overlapped relation.

The operation of the write transducer head 19 in recording information on the magnetizable outer periphery of the drum is shown in FIGURES 3 and 4 of the drawings. The flux paths in the magnetic circuit defined by the core structure 30, the magnetizable record medium 11 and the space between the transducer head and the magnetic drum are represented by the arrows 70. Energization of the electric coil 29 changes the flux in the magnetic circuit and a magnetized pattern 71 is recorded on the surface of the magnetic drum. Since the magnetic drum is rotating, the magnetizable pattern 71 takes the form of a relatively thin and elongated magnetic recording track 72. The width of the track 72 is substantially the same as the width of the core structure 30 since the majority of the flux flows vertically between the magnetizable record medium and the bottom surfaces of the core legs 32 and 34. However, fringing or leakage flux paths as represented by arrows 74 are present which magnetize side edges 75 of the track 72. In this manner, the overall width of the track 72 is slightly greater than the width of the core structure.

The width of a single magnetic recording track is limited, for the most part, by the physical dimensions of the core structure 30 and the relative spacing between the gap 40 and the surface 11 of the rotating magnetic drum. The limitations on these physical variables are determined by conditions other than the width of a recording track. For example, the core structure 30 must have sufficient rigidity and physical strength to raise the supporting shoe 37 when the lifting bar 43 is moved upward.

In accordance with prior art teaching, information is usually recorded in tracks which are aligned in adjacent side-by-side relation on the outer periphery 11 of the magnetic drum. These individual tracks are slightly spaced from each other whereby the total width required for recording a plurality of tracks is determined by multiplying the width of an individual track times the number of tracks plus the total spacing between the adjacent tracks.

The adjacent magnetic recording tracks are partially overlapped in accordance with the teachings of the present invention. Each has a width which is much smaller than the width of a single track recorded by the write transducer head 19. This arrangement is depicted in FIGURE 4 of the drawings.

A plurality of adjacent and partially overlapped tracks 80–85 are shown as having been recorded on the magnetizable surface of the rotating magnetic drum by the write transducer head 19. The write tranducer head 19 is in the process of recording track 86 and this track overlies or overlaps a substantial portion of the width of the previous and adjacent record track 85. The portions of a recorded track that are overlapped are effectively erased and assume a magnetic pattern corresponding to the changing flux in the magnetic circuit of the transducer head 19 during the next pass of the same. The magnetic track 86 is much wider than the width of the remaining portions of any of the overlapped tracks 80–85. A greatly increased number of individual tracks are recorded in a given width of the magnetic record medium when compared with prior art techniques for the same purpose.

For example, the remaining and unoverlapped portions of the tracks 80–85 may constitute only one set of side edges 75 of these tracks recorded by the fringing flux of the write transducer head. The amount of overlap of the adjacent tracks will, of course, depend upon the particular application intended, the type of read transducer head employed, etc. In any event, a large number of tracks may be recorded in the same space occupied by a single track recorded in accordance with prior art teachings.

Figure 5:
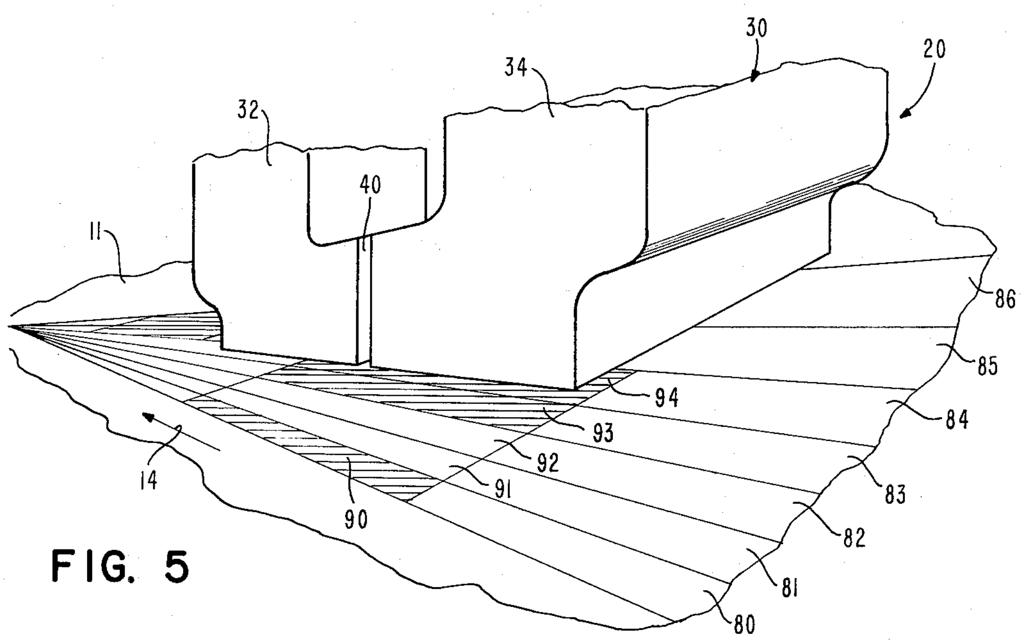
FIGURE 5 is an enlarged perspective view of a transducer sensing the information recorded in a plurality of tracks on a magnetizable record medium.

In sensing the information recorded on the extremely thin and partially overlapped tracks the read transducer head 20 is used as shown in FIGURE 5 of the drawings. The read transducer head 20 is of a sufficient size to simultaneously sense the magnetic information recorded on a plurality of the partially overlapped and extremely thin record tracks. In the illustrated embodiment of the invention the read transducer head is depicted in transducing relation with the record tracks 80–85. The electrical output signal provided by the read transducer head 20 is a resultant signal and corresponds to the sum of the information recorded on all five of the tracks being read thereby at any particular instant in time. The read transducer head 20 is moved across the magnetic drum in incremental steps or in a continuous manner whereby the partially overlapped tracks are read in blocks of five. While the transducer head 20 is adapted to simultaneously read five tracks, it should be understood that the number of tracks which are simultaneously read will depend upon the requirements of any particular use or application.

The above-described method of recording and reproducing information on a magnetizable record medium is ideally adapted for use in connection with digital processing apparatus. In this type of apparatus a first condition, whether the same be an electrical signal, a state of magnetization, or the like, represents the binary digit zero while an alternative or second condition represents the binary digit one.

Further, the method is particularly adapted for use in connection with digital processing apparatus when a system of recording is employed which assigns one and only one magnetic storage pattern to represent a given binary state. Biased discrete spot (BDS) recording is one example of a system that satisfies this condition. Briefly, in this system the magnetizable storage medium is normally biased in one direction of magnetization and one type of information quantity, the binary one, for example, is recorded by reversing this bias for a short period of time within the bit cell. Another type of information quantity, the binary zero, is recorded by perpetuating the bias within the whole or entire cell. All of the binary ones are represented by small identical bipolar magnets within the bit cells of the tracks on the drum and the leading edge of each magnetic spot sensed by the read transducer head 20 is always of the same polarity. The arrangement is such that the voltages developed in the electrical coil of the read transducer head are additive in all instances. A more complete description of the biased discrete spot recording technique is found in the co-pending patent application of Robert A. Tuttle, Serial No. 782,267, filed December 22, 1958, now Patent No. 3,035,255, entitled "Magnetic Recording System," which is assigned to the assignee of the present application. However, it should be clearly understood that the method of this invention, in its broader aspects, is not limited to the use of any particular recording technique.

Considering now the operation of the above-described apparatus in providing highly accurate and reliable data, the write transducer head 19 is moved to a first position along the magnetic drum and the electric coil 29 thereof is energized in accordance with a signal representing a first information quantity. When the first track has been recorded the write transducer head is moved transversely with respect to the direction of rotation of the magnetic drum by a predetermined distance. A second signal corresponding to the first information quantity energizes the electrical coil of this transducer head and a second track is recorded in partially overlapped relation with respect to the first track. The first and second tracks represent the same information quantity and corresponding bits of data are positioned in aligned side-by-side relation on these tracks. Third, fourth and fifth tracks corresponding to the same information quantity are recorded in partially overlapped relation in a similar manner. There are thus provided five redundant record tracks for the information quantity with the bit cells of these tracks representing any particular bit of data in the information quantity being transversely aligned with respect to each other.

A second information quantity is recorded by supplying five serial and redundant electrical signals representing this information quantity to the write transducer head 19 and five partially overlapped tracks are recorded on the record medium. As many information quantities as desired are recorded on the magnetic drum with five redundant input signals and a grouping of five partially overlapped record tracks being provided for each information quantity. It will be noted that a large number of tracks can be recorded on the magnetizable surface of the magnetic drum since the tracks are partially overlapped and occupying a minimum of space.

In retrieving the information recorded on the magnetic drum the read transducer head 20 is employed. The read transducer head is moved along the drum until the same is disposed in transducing relation with respect to the five partially overlapped tracks representing the first information quantity. This is shown in FIGURE 5 where the read transducer head 20 is depicted in transducing relation with the partially overlapped record tracks 80–84. As the drum is rotated, the read transducer head 20 simultaneously senses the data recorded on all five of the record tracks 80–84 and provides an electrical signal corresponding to the resultant on the magnetic patterns of these tracks. The tracks 80–84 contain redundant information whereby corresponding and transversely aligned bit cells on these tracks are related to the same bit of data in the information quantity. For example, the bit cells 90–94 on the partially overlapped tracks 80–84 are shown to correspond to the binary digit one in the recorded information quantity which is represented by a particular magnetization state within these bit cells.

Figure 6:
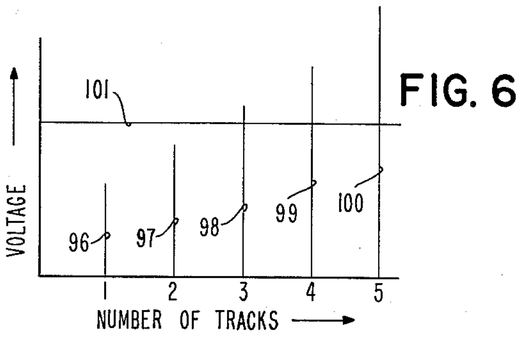
FIGURE 6 is a graphical representation of the voltage outputs from the transducer for various combinations of similar information quantities recorded on five tracks of a magnetizable record medium.

The read head 20 simultaneously reads all of the five partially overlapped tracks to provide an output signal. If the biased discrete spot system of recording is employed and the binary one is recorded by reversing the bias for a short period of time within a bit cell, the output signal from the read transducer head is represented by the lines 96–100 in FIGURE 6 of the drawings. For example, if a binary one is present in only one of the five corresponding bit cells, a voltage indicated by the line 96 will result. If, however, three of the aligned bit cells representing the same bit of data in an information quantity have a binary one recorded therein, the output signal from the read transducer head is indicated by the line 98.

The gating means 50 is in effect a voltage level switch which passes signals having at least a predetermined minimum voltage level. The setting of the gating means is represented by the horizontal line 101 in FIGURE 6 of the drawings. The arrangement is such that the output signal $V_O$ of the gating means corresponds to the binary zero when less than three of the related bit cells on the five partially overlapped record tracks contain a binary one. In a similar manner, the output signal $V_O$ indicates a binary one when at least three of the related bit cells on the five tracks contain a binary one.

In FIGURE 5 of the drawings the bit cells 90, 93 and 94 of the tracks 80, 82 and 84, respectively, are indicated as having a binary one recorded therein while the bit cells 91 and 92 of the tracks 81 and 82 are shown as having a state of magnetization which represents the binary digit zero. The presence of a binary one in the majority of the bit cells indicates that a binary one is present in the information quantity. The absence of binary ones in the bit cells 91 and 92 may be used to any of a variety of reasons including attenuation in transmission, a temporary failure of apparatus, etc. The signal from the read transducer head 20 is represented by the line 98 and the output signal from the gating means 50 will indicate a binary one.

The method and apparatus of the invention have been disclosed in connection with recording and reproducing of digital data. However, the teachings are equally applicable to other types of data as, for example, analog signals. In this case, the gating means would not be employed and the additive effect due to the simultaneous reading of the record tracks containing redundant information would be relied on for separating the desired information from spurious and extraneous signals. The recording of a plurality of partially overlapping tracks can be accomplished in a parallel fashion by providing a plurality of staggered write heads about the drum. Suitable time delay circuitry would be associated with the write transducer heads whereby the same portions of the redundant input signals are recorded in adjacent side-by-side relation on the record medium. Also, means may be included for erasing a portion of the width of the last recorded track whereby all record tracks have the same width.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. The method of recording information on a record medium comprising the steps of effecting relative movement between said medium and a transducer means while energizing said transducer means to record a first track on said record medium, effecting relative movement between said record medium and said transducer means to record a second track in partially overlapped immediate adjacent relation with respect to said first track, and the resultant width of said first track being less than the width of a single track recorded by said transducer means.

2. The method of recording information on a magnetizable record medium which comprises the steps of effecting relative movement between said magnetizable record medium and a magnetic transducer head while energizing said magnetic transducer head to record a first track on said magnetizable record medium, effecting relative movement between said magnetizable record medium and said magnetic transducer head to record a second track in partially overlapped in immediate adjacent side-by-side relation with respect to said first track, and the resultant width of said first track being less than the width of a single track recorded by said magnetic transducer head.

3. The method of recording and reproducing information which comprises the steps of recording a plurality of redundant signals representing an information quantity on a plurality of immediately adjacent record tracks so that the portions of said redundant signals relating to the same portion of said information quantity are recorded in aligned and adjacent side-by-side relation, said adjacent record tracks being recorded in partially overlapped relation so that the resultant width of a partially overlapped track is smaller than the width of a single record track, and simultaneously sensing the information on said adjacent record tracks pertaining to said portions of said redundant signals with a transducer means which is wider than said plurality of adjacent record tracks whereby the output signal from the transducer means is the composite of the redundant information recorded on said adjacent record tracks.

References Cited by the Examiner

UNITED STATES PATENTS

| | | | |
|---|---|---|---|
| 2,610,257 | 9/1952 | Wissmann | 179—100.2 |
| 2,628,346 | 2/1953 | Burkhart | 340—174.1 |
| 2,937,368 | 5/1960 | Newby | 346—74 X |
| 3,058,112 | 10/1962 | Bertelsen et al. | 346—74 |

IRVING L. SRAGOW, *Primary Examiner.*

R. M. JENNINGS, A. I. NEUSTADT, *Assistant Examiners.*